United States Patent
Tago et al.

(10) Patent No.: US 9,280,016 B2
(45) Date of Patent: Mar. 8, 2016

(54) LIQUID CRYSTAL DISPLAY DEVICE

(71) Applicant: Japan Display, Inc., Minato-ku (JP)

(72) Inventors: Keiji Tago, Tokyo (JP); Hirokazu Morimoto, Tokyo (JP)

(73) Assignee: Japan Display Inc., Minato-ku (JP)

( * ) Notice: Subject to any disclaimer, the term of this patent is extended or adjusted under 35 U.S.C. 154(b) by 217 days.

(21) Appl. No.: 14/171,092

(22) Filed: Feb. 3, 2014

(65) Prior Publication Data

US 2014/0232953 A1   Aug. 21, 2014

(30) Foreign Application Priority Data

Feb. 18, 2013  (JP) ................................. 2013-028837

(51) Int. Cl.
 *G02F 1/1335* (2006.01)
 *G02F 1/1333* (2006.01)
 *G02F 1/1343* (2006.01)
 *G02F 1/13363* (2006.01)

(52) U.S. Cl.
 CPC ...... *G02F 1/133555* (2013.01); *G02F 1/13439* (2013.01); *G02F 1/133371* (2013.01); *G02F 2001/133638* (2013.01)

(58) Field of Classification Search
 CPC ..................... G02F 1/133553; G02F 1/133555
 See application file for complete search history.

(56) References Cited

U.S. PATENT DOCUMENTS

| | | | |
|---|---|---|---|
| 6,266,116 B1 | 7/2001 | Ohta et al. | |
| 2001/0010575 A1 | 8/2001 | Yoshida et al. | |
| 2004/0165136 A1 | 8/2004 | Sugiyama et al. | |
| 2005/0162893 A1 | 7/2005 | Yagi et al. | |
| 2005/0206824 A1 | 9/2005 | Son et al. | |
| 2005/0219453 A1 | 10/2005 | Kubo et al. | |
| 2007/0115234 A1 | 5/2007 | Kim et al. | |
| 2007/0222927 A1* | 9/2007 | Uehara | G02F 1/133634 349/114 |
| 2008/0062358 A1 | 3/2008 | Lee et al. | |
| 2008/0180590 A1 | 7/2008 | Lee et al. | |
| 2008/0180623 A1 | 7/2008 | Lee et al. | |
| 2008/0186439 A1 | 8/2008 | Kwon et al. | |
| 2008/0309841 A1 | 12/2008 | Yagi et al. | |
| 2009/0135354 A1* | 5/2009 | Mitsui | G02F 1/133707 349/114 |
| 2011/0025937 A1 | 2/2011 | Yagi et al. | |
| 2014/0139789 A1* | 5/2014 | Guo | G02F 1/1335 349/113 |

FOREIGN PATENT DOCUMENTS

| | | |
|---|---|---|
| JP | 6-222397 | 8/1994 |
| JP | 7-159807 | 6/1995 |
| JP | 9-160041 | 6/1997 |
| JP | 9-160042 | 6/1997 |

(Continued)

*Primary Examiner* — Dung Nguyen
(74) *Attorney, Agent, or Firm* — Oblon, McClelland, Maier & Neustadt, L.L.P.

(57) ABSTRACT

According to one embodiment, a liquid crystal display device includes a first substrate including a transmissive pixel electrode disposed in a transmissive display area, and a reflective pixel electrode with a planar plate shape which is disposed in a reflective display area, a second substrate including a common electrode, a liquid crystal layer being configured to have a less thickness in the reflective display area than in the transmissive display area, to impart a phase difference of ¼ wavelength to light passing at an OFF time in the reflective display area, and to impart no phase difference to light passing at an ON time in the reflective display area, and a retardation plate disposed between a second polarizer and the second substrate in the reflective display area.

20 Claims, 7 Drawing Sheets

(56) References Cited

FOREIGN PATENT DOCUMENTS

| JP | 9-160061 | 6/1997 |
|----|----------|--------|
| JP | 10-26765 | 1/1998 |
| JP | 10-90708 | 4/1998 |
| JP | 2005-3802 | 1/2005 |
| JP | 3644653 | 5/2005 |
| JP | 2005-242307 | 9/2005 |
| JP | 2012-113332 | 6/2012 |

* cited by examiner

F.I.G. 1

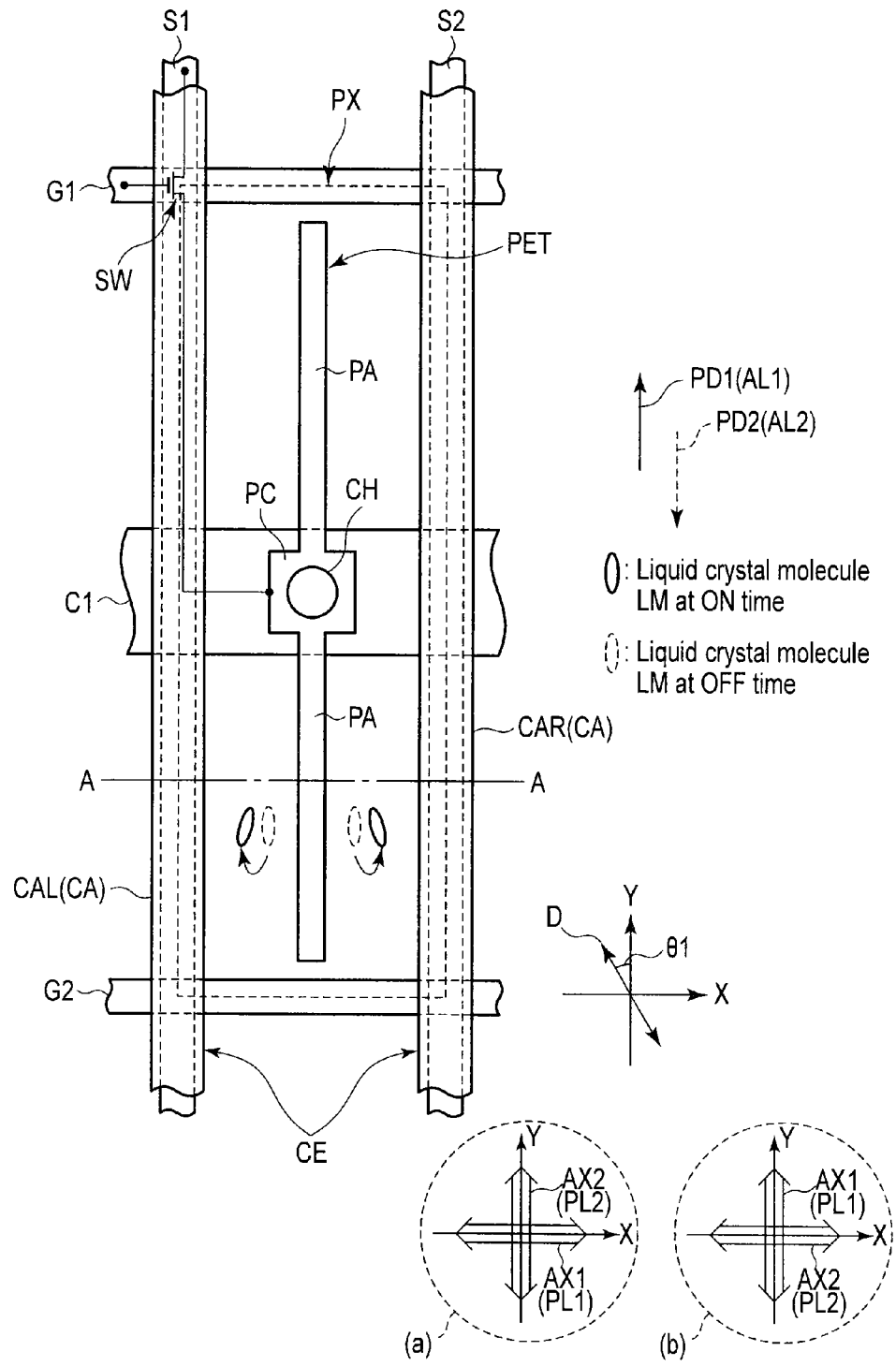
F I G. 3

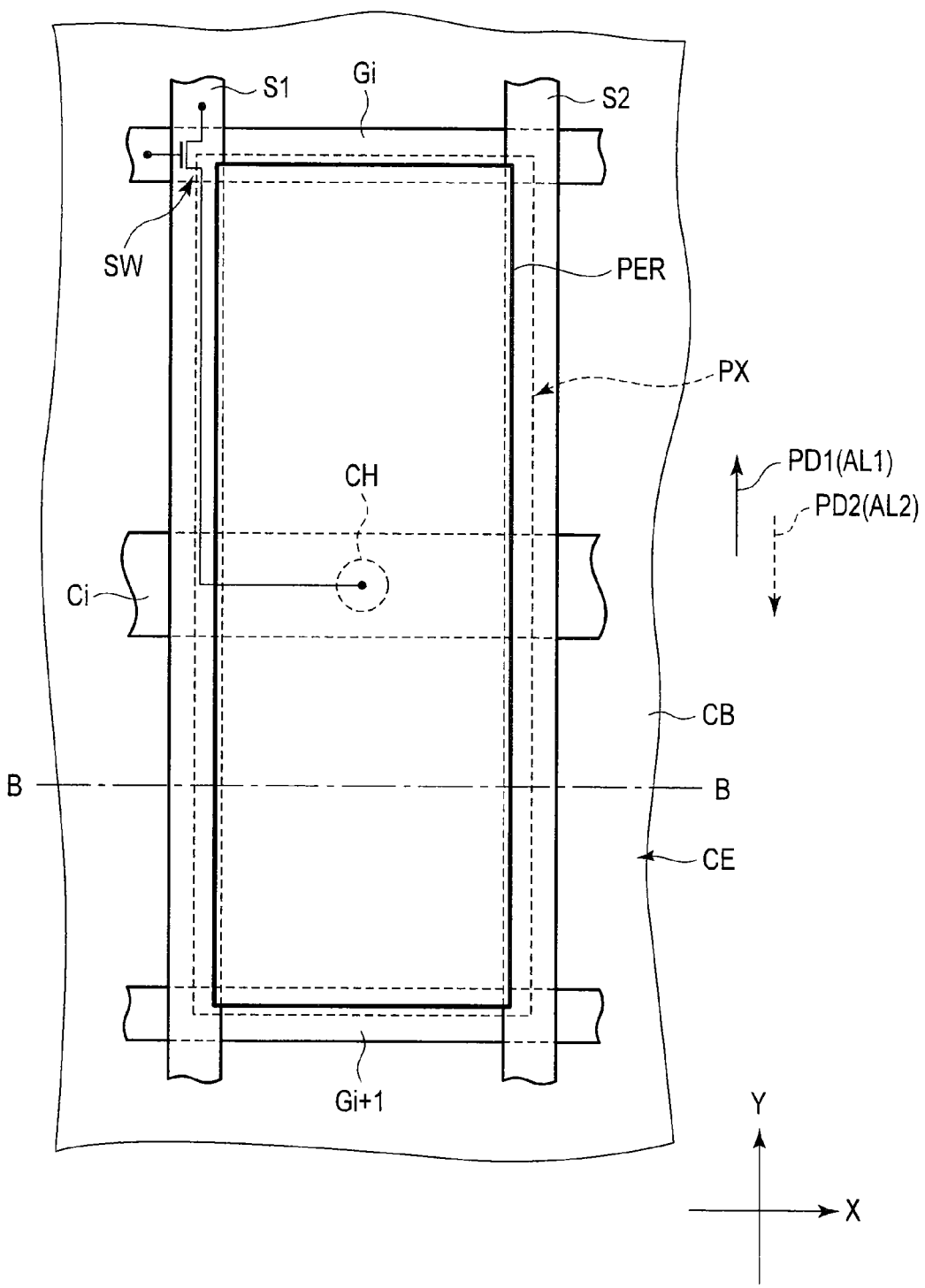
F I G. 4

LIQUID CRYSTAL DISPLAY DEVICE

CROSS-REFERENCE TO RELATED APPLICATIONS

This application is based upon and claims the benefit of priority from Japanese Patent Application No. 2013-028837, filed Feb. 18, 2013, the entire contents of which are incorporated herein by reference.

FIELD

Embodiments described herein relate generally to a liquid crystal display device.

BACKGROUND

In recent years, flat-panel display devices have been vigorously developed. By virtue of such advantageous features as light weight, small thickness and low power consumption, special attention has been paid to liquid crystal display devices among others. In particular, in active matrix liquid crystal display devices in which switching elements are incorporated in respective pixels, attention is paid to the configuration which makes use of a lateral electric field (including a fringe electric field), such as an IPS (In-Plane Switching) mode or an FFS (Fringe Field Switching) mode. Such a liquid crystal display device of the lateral electric field mode includes pixel electrodes and a counter-electrode, which are formed on an array substrate, and liquid crystal molecules are switched by a lateral electric field which is substantially parallel to a major surface of the array substrate.

On the other hand, there has been proposed a technique of switching liquid crystal molecules by producing a lateral electric field or an oblique electric field between pixel electrodes formed on the array substrate and a counter-electrode formed on the counter-substrate.

The power consumption of the liquid crystal display device increases as the screen size becomes larger. This is a factor of limiting the time of use, for example, when the liquid crystal display device is mounted on a portable electronic apparatus.

BRIEF DESCRIPTION OF THE DRAWINGS

FIG. 3 is a plan view which schematically illustrates a structure example of one pixel at a time when a transmissive display area of the liquid crystal display panel shown in FIG. 1 is viewed from a counter-substrate side.

FIG. 4 is a plan view which schematically illustrates a structure example of one pixel at a time when a reflective display area of the liquid crystal display panel shown in FIG. 1 is viewed from the counter-substrate side.

DETAILED DESCRIPTION

Figure 1:
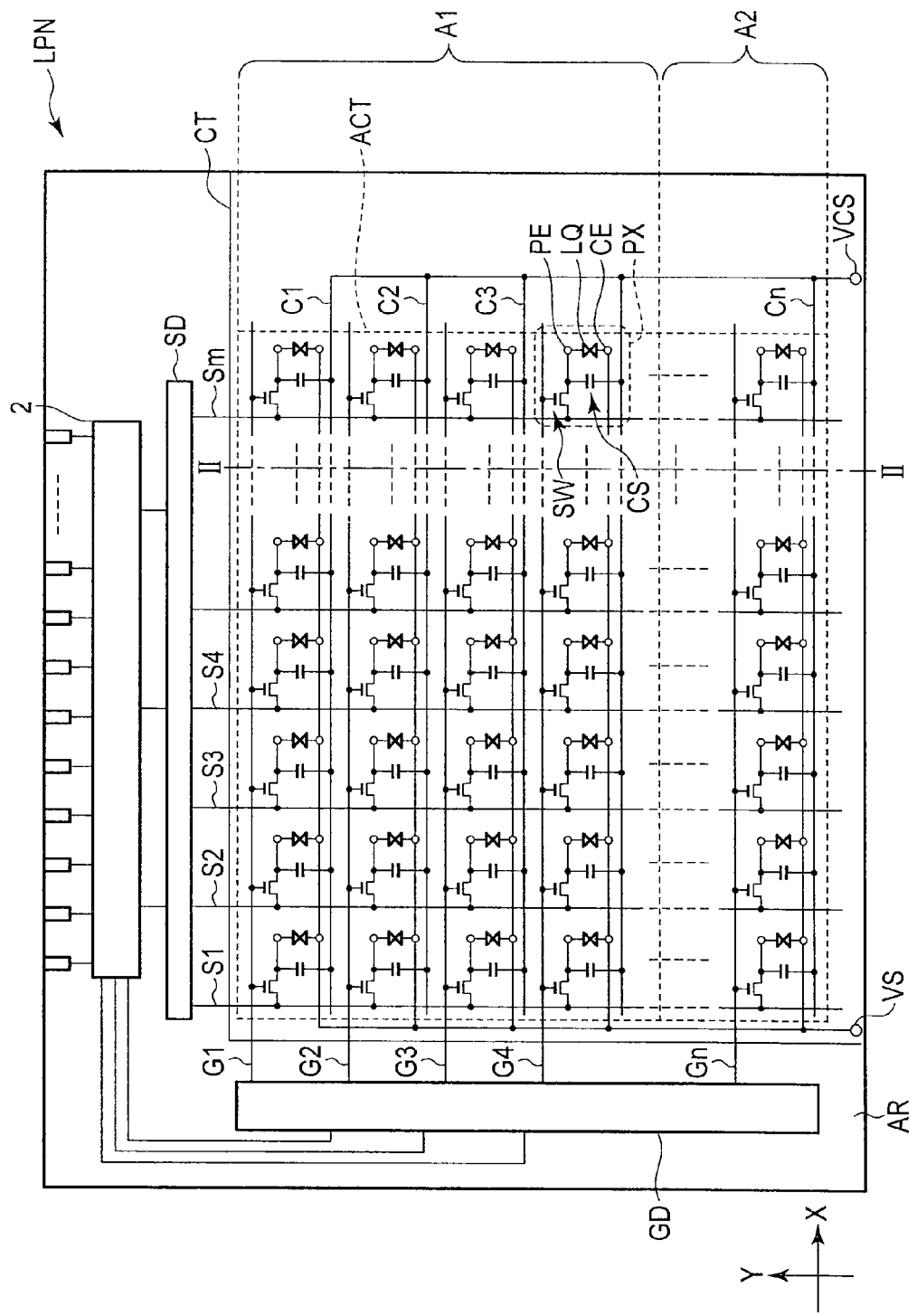
FIG. 1 is a view which schematically illustrates a structure and an equivalent circuit of a liquid crystal display device according to an embodiment.

In general, according to one embodiment, a liquid crystal display device includes: a first substrate including a transmissive pixel electrode which is disposed in a transmissive display area and includes a main pixel electrode with a strip shape extending in a second direction, a reflective pixel electrode with a planar plate shape which is disposed in a reflective display area, and a shield electrode which is disposed in the transmissive display area; a second substrate including a common electrode which includes a plate electrode with a planar plate shape opposed to the reflective pixel electrode, the common electrode having the same potential as the shield electrode; a liquid crystal layer including liquid crystal molecules held between the first substrate and the second substrate, the liquid crystal layer being configured to have a less thickness in the reflective display area than in the transmissive display area, to impart a phase difference of ¼ wavelength to light passing at an OFF time in the reflective display area, and to impart no phase difference to light passing at an ON time in the reflective display area; a first polarizer disposed on an outside of the first substrate and having a first polarization axis; a second polarizer disposed on an outside of the second substrate and having a second polarization axis which is perpendicular to the first polarization axis; and a retardation plate disposed between the second polarizer and the second substrate in the reflective display area, and configured to impart a phase difference of ½ wavelength.

According to one embodiment, a liquid crystal display device includes: a first substrate including a transmissive pixel electrode disposed in a transmissive display area, and a reflective pixel electrode disposed in a reflective display area; a second substrate including a common electrode which is formed to extend over the transmissive display area and the reflective display area; a liquid crystal layer including liquid crystal molecules held between the first substrate and the second substrate, the liquid crystal layer being configured to have a less thickness in the reflective display area than in the transmissive display area, to impart a phase difference of ¼ wavelength to light passing at an OFF time in the reflective display area, and to impart no phase difference to light passing at an ON time in the reflective display area; a first polarizer disposed on an outside of the first substrate and having a first polarization axis; a second polarizer disposed on an outside of the second substrate and having a second polarization axis which is perpendicular to the first polarization axis; and a retardation plate disposed between the second polarizer and the second substrate in the reflective display area, and configured to impart a phase difference of ½ wavelength.

Embodiments will now be described in detail with reference to the accompanying drawings. In the drawings, structural elements having the same or similar functions are denoted by like reference numerals, and an overlapping description is omitted.

FIG. 1 is a view which schematically shows a structure and an equivalent circuit of a liquid crystal display device according to an embodiment.

Specifically, the liquid crystal display device includes an active-matrix-type liquid crystal display panel LPN. The liquid crystal display panel LPN includes an array substrate AR which is a first substrate, a counter-substrate CT which is a second substrate that is disposed to be opposed to the array substrate AR, and a liquid crystal layer LQ which is held between the array substrate AR and the counter-substrate CT.

The liquid crystal display panel LPN includes an active area ACT which displays an image. The active area ACT is composed of a plurality of pixels PX which are arrayed in a matrix of m×n (m and n are positive integers). In the present embodiment, the active area ACT includes a transmissive display area A1 and a reflective display area A2. The transmissive display area A1 and reflective display area A2 are arranged, for example, along a second direction Y. The transmissive display area A1 is an area which displays an image, mainly by selectively passing backlight which is incident on the liquid crystal display panel LPN. The reflective display area A2 is an area which displays an image, mainly by selectively reflecting ambient light which is incident on the liquid crystal display panel LPN.

The liquid crystal display panel LPN includes, in the active area ACT, an n-number of gate lines G (G1 to Gn), an n-number of storage capacitance lines C (C1 to Cn), and an m-number of source lines S (S1 to Sm). The gate lines G and storage capacitance lines C extend, for example, substantially linearly in a first direction X. The gate lines G and storage capacitance lines C are alternately arranged along the second direction Y crossing the first direction X. In this example, the first direction X and the second direction Y are perpendicular to each other. The source lines S cross the gate lines G and storage capacitance lines C. The source lines S extend substantially linearly in the second direction Y. It is not always necessary that each of the gate lines G, storage capacitance lines C and source lines S extend linearly, and a part thereof may be bent.

Each of the gate lines G is led out of the active area ACT and is connected to a gate driver GD. Each of the source lines S is led out of the active area ACT and is connected to a source driver SD. At least parts of the gate driver GD and source driver SD are formed on, for example, the array substrate AR, and the gate driver GD and source driver SD are connected to a driving IC chip 2 which incorporates a controller.

Each of the pixels PX includes a switching element SW, a pixel electrode PE and a common electrode CE. A storage capacitance CS is formed, for example, between the storage capacitance line C and the pixel electrode PE. The storage capacitance line C is electrically connected to a voltage application module VCS to which a storage capacitance voltage is applied.

In the present embodiment, the liquid crystal display panel LPN is configured such that the pixel electrodes PE are formed on the array substrate AR, and at least a part of the common electrode CE is formed on the counter-substrate CT, and liquid crystal molecules of the liquid crystal layer LQ are switched by mainly using an electric field which is produced between the pixel electrodes PE and the common electrode CE.

The switching element SW is composed of, for example, an n-channel thin-film transistor (TFT). The switching element SW is electrically connected to the gate line G and source line S. The switching element SW may be of a top gate type or a bottom gate type. In addition, a semiconductor layer of the switching element SW is formed of, for example, polysilicon, but it may be formed of amorphous silicon.

The pixel electrodes PE are disposed in the respective pixels PX, and are electrically connected to the switching elements SW. The common electrode CE is disposed common to the pixel electrodes PE of plural pixels PX via the liquid crystal layer LQ. The array substrate AR includes a power supply module VS for applying a voltage to the common electrode CE. The power supply module VS is formed, for example, on the outside of the active area ACT. The common electrode CE is led out to the outside of the active area ACT, and is electrically connected to the power supply module VS via an electrically conductive member (not shown).

Figure 2:
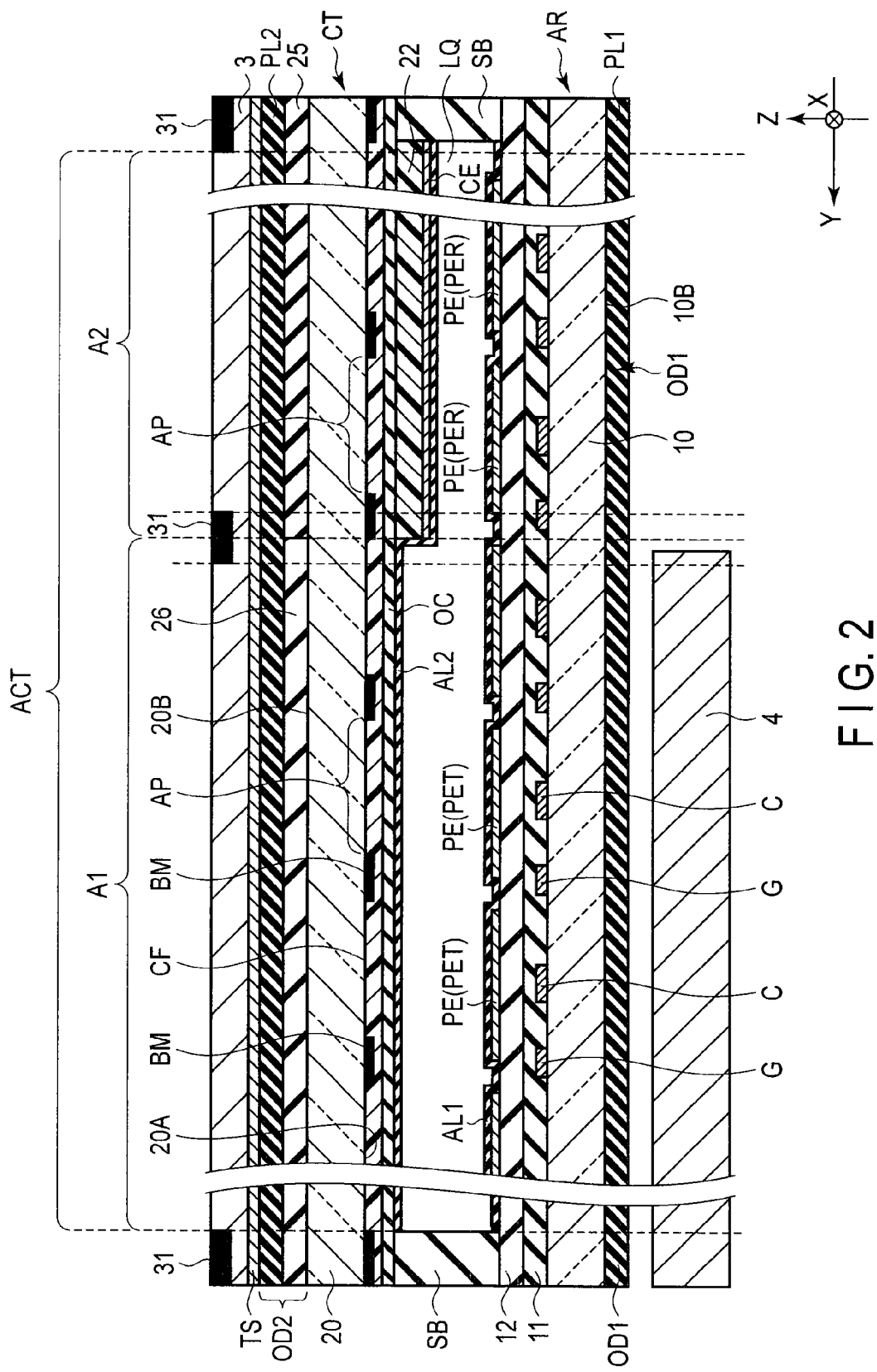
FIG. 2 is a cross-sectional view, taken along line II-II in FIG. 1, which schematically illustrates an example of a cross section of a liquid crystal display panel shown in FIG. 1.

FIG. 2 is a cross-sectional view, taken along line II-II in FIG. 1, which schematically illustrates an example of a cross section of the liquid crystal display panel LPN shown in FIG. 1. FIG. 2 shows only parts which are necessary for the description.

In the transmissive display area A1, a backlight 4 is disposed on the back side of the array substrate AR which constitutes the liquid crystal display panel LPN. Various modes are applicable to the backlight 4. As the backlight 4, use may be made of either a backlight which utilizes a light-emitting diode (LED) as a light source, or a backlight which utilizes a cold cathode fluorescent lamp (CCFL) as a light source. A description of the detailed structure of the backlight 4 is omitted.

The array substrate AR is formed by using a first insulative substrate 10 having light transmissivity. Gate lines G and storage capacitance lines C are formed on the first insulative substrate 10, and are covered with a first interlayer insulation film 11. Source lines (not shown) are formed on the first interlayer insulation film 11 and are covered with a second interlayer insulation film 12. Pixel electrodes PE are formed on the second interlayer insulation film 12.

The pixel electrodes PE include transmissive pixel electrodes PET disposed in the transmissive display area A1, and reflective pixel electrodes PER disposed in the reflective display area A2. The transmissive pixel electrodes PET are formed of a transparent, electrically conductive material such as indium tin oxide (ITO) or indium zinc oxide (IZO), so as to pass light from the backlight 4. The reflective pixel electrodes PER reflect ambient light, which has entered the liquid crystal display panel LPN from the counter-substrate CT side, back to the counter-substrate CT side. Specifically, the reflective pixel electrodes PER are formed of an opaque, electrically conductive material such as aluminum (Al), which reflects light. Incidentally, the surface of the reflective pixel electrode PER is formed to have such asperities as to avoid mirror reflection.

A first alignment film AL1 is disposed on that surface of the array substrate AR, which is opposed to the counter-substrate CT, and the first alignment film AL1 extends over substantially the entirety of the active area ACT. The first alignment film AL1 covers the pixel electrode PE, etc., and is also disposed on the second interlayer insulation film 12.

The counter-substrate CT is formed by using a second insulative substrate 20 having light transmissivity. The counter-substrate CT includes a black matrix BM, a color filter CF, an overcoat layer OC, a projection 22, a common electrode CE and a second alignment film AL2.

The black matrix BM partitions each pixel PX and forms an aperture portion AP which is opposed to the pixel electrode PE. Specifically, the black matrix BM is disposed so as to be opposed to wiring portions, such as the source lines, gate lines G, storage capacitance lines C and switching elements. In the example illustrated, only the portions of the black matrix BM, which extend in the first direction X, are shown, but the black matrix BM may also include portions extending in the second direction Y. The black matrix BM is disposed on an inner surface 20A of the second insulative substrate 20, which is opposed to the array substrate AR.

The color filter CF is disposed in association with each pixel PX. Specifically, the color filter CF is disposed in the aperture portion AP on the inner surface 20A of the second insulative substrate 20, and a part of the color filter CF extends over the black matrix BM. Color filters CF, which are disposed in the pixels PX neighboring in the first direction X, have mutually different colors. For example, the color filters CF are formed of resin materials which are colored in three primary colors of red, blue and green. A red color filter CF(R), which is formed of a resin material that is colored in red, is disposed in association with a red pixel. A blue color filter CF(B), which is formed of a resin material that is colored in blue, is disposed in association with a blue pixel. A green color filter CF(G), which is formed of a resin material that is colored in green, is disposed in association with a green pixel. Boundaries between these color filters CF are located at positions overlapping the black matrix BM.

The overcoat layer OC covers the color filters CF. The overcoat layer OC reduces the effect of asperities on the surface of the color filters CF.

The projection 22 is disposed, in the reflective display area A2, on that side of the overcoat layer OC, which is opposed to the array substrate AR. The projection 22 is formed of, for example, a transparent resin material. The thickness of the projection 22 is set in accordance with the thickness of the liquid crystal layer LQ in the reflective display area A2. The retardation of the liquid crystal layer LQ in the reflective display area A2 is made to substantially equal to the retardation of the liquid crystal layer LQ in the transmissive display area A1, by adjusting the thickness of the projection 22. Specifically, the thickness of the projection 22 is set so that the thickness of the liquid crystal layer LQ in the reflective display area A2 may become smaller than the thickness of the liquid crystal layer LQ in the transmissive display area A1. Preferably, the thickness of the projection 22 is set so that the thickness of the liquid crystal layer LQ in the reflective display area A2 may become about ½ of the thickness of the liquid crystal layer LQ in the transmissive display area A1.

The common electrode CE is formed of a transparent, electrically conductive material such as ITO or IZO. The common electrode CE is formed over the transmissive display area A1 and reflective display area A2. To be more specific, the common electrode CE is formed on that side of the overcoat layer OC in the transmissive display area A1, which is opposed to the array substrate AR, and is formed on that side of the projection 22 in the reflective display area A2, which is opposed to the array substrate AR. A third direction Z is a direction perpendicular to the first direction X and second direction Y, or is a normal direction of the liquid crystal display panel LPN.

A second alignment film AL2 is disposed on that surface of the counter-substrate CT, which is opposed to the array substrate AR, and the second alignment film AL2 extends over substantially the entirety of the active area ACT. The second alignment film AL2 covers the common electrode CE, overcoat layer OC and projection 22.

The first alignment film AL1 and second alignment film AL2 are subjected to, where necessary, alignment treatment (e.g. rubbing treatment or optical alignment treatment) for initially aligning the liquid crystal molecules of the liquid crystal layer LQ. In the transmissive display area A1, a first alignment treatment direction PD1 (shown in FIG. 3), in which the first alignment film AL1 initially aligns the liquid crystal molecules, and a second alignment treatment direction PD2 (shown in FIG. 3), in which the second alignment film AL2 initially aligns the liquid crystal molecules, are parallel to each other and are opposite or identical to each other. In the example illustrated, the first alignment treatment direction PD1 and the second alignment treatment direction PD2 are, for example, parallel to the second direction Y and opposite to each other. By performing such alignment treatment, multiple domains are formed in one pixel, and a viewing angle characteristic is improved.

In the meantime, in the reflective display area A2, when the liquid crystal alignment mode is set to be, for example, a vertical alignment (VA) mode, vertical alignment films, which are pre-treated so as to align liquid crystal molecules in a vertical direction, are used for the first alignment film AL1 and second alignment film AL2 in the reflective display area A2. Thus, there is no need to perform alignment treatment.

The above-described array substrate AR and counter-substrate CT are disposed such that their first alignment film AL1 and second alignment film AL2 are opposed to each other. Specifically, the projection 22 of the counter-substrate CT is disposed to be opposed to plural reflective pixel electrodes PER. In this case, columnar spacers, which are formed of, e.g. a resin material so as to be integral to one of the array substrate AR and counter-substrate CT, are disposed between the first alignment film AL1 of the array substrate AR and the second alignment film AL2 of the counter-substrate CT. Thereby, a predetermined cell gap is created. The cell gap in the transmissive display area A1 is, for example, 2 to 7 μm, and the cell gap in the reflective display area A2 is about ½ of the cell gap in the transmissive display area A1. The array substrate AR and counter-substrate CT are attached by a sealant SB on the outside of the active area ACT in the state in which the predetermined cell gap is created therebetween.

The liquid crystal layer LQ is held in the cell gap which is created between the array substrate AR and the counter-substrate CT, and is disposed between the first alignment film AL1 and second alignment film AL2. The liquid crystal layer LQ is composed of, for example, a liquid crystal material having a positive (positive-type) dielectric constant anisotropy.

A first optical element OD1 including a first polarizer PL1 is attached to an outer surface of the array substrate AR, for example, an outer surface 10B of the first insulative substrate 10, by an adhesive or the like. The first optical element OD1 is a linear polarizer which is located on that side of the liquid crystal display panel LPN, which is opposed to the backlight 4, and controls the polarization state of incident light which enters the liquid crystal display panel LPN from the backlight 4. The first polarizer PL1 is a linear polarizer having a first polarization axis (or first absorption axis) AX1.

A second optical element OD2 is attached to an outer surface of the counter-substrate CT, for example, an outer surface 20B of the second insulative substrate 20 by an adhesive or the like. The second optical element OD2 is located on the display surface side of the liquid crystal display panel LPN, and controls the polarization state of emission light emerging from the liquid crystal display panel LPN and the polarization state of ambient light entering the liquid crystal display panel LPN. The second optical element OD2 includes a second polarizer PL2 which is disposed over the transmissive display area A1 and reflective display area A2, and a retardation plate 25 which is disposed in the reflective display area A2. The retardation plate 25 imparts a phase difference of ½ wavelength to the transmissive light. The retardation plate 25 is disposed between the outer surface 20B of the second insulative substrate 20 and the second polarizer PL2.

In the meantime, in the transmissive display area A1, a plate member, which is formed of a transparent resin material or the like, may be disposed between the outer surface 20B of the second insulative substrate 20 and the second polarizer PL2. The plate member 26 has substantially no phase difference, and has no function as a retardation plate. The thickness of the plate member 26 is equal to the thickness of the retardation plate 25. By disposing the plate member 26, no gap occurs between the second polarizer PL2 and the second insulative substrate 20 in the transmissive display area A1, and no stepped portion occurs at a boundary between the transmissive display area A1 and reflective display area A2.

In FIG. 2, the second polarizer PL2 is disposed as one body over the transmissive display area A1 and reflective display area A2. Alternatively, the second polarizer PL2 may is disposed as separate bodies disposed in the transmissive display area A1 and reflective display area A2, respectively. The second polarizer PL2 is a linear polarizer having a second polarization axis (or second absorption axis) AX2.

The first polarization axis AX1 and the second polarization axis AX2 have a substantially orthogonal positional relationship (crossed Nicols). In this case, one of the polarizers is disposed, for example, such that the polarization axis thereof is parallel or perpendicular to the initial alignment direction of liquid crystal molecules in the transmissive display area A1, that is, to the first alignment treatment direction PD1 or second alignment treatment direction PD2. When the initial alignment direction is parallel to the second direction Y, the polarization axis of one of the polarizers is parallel to the second direction Y or is parallel to the first direction X.

In an example shown in part (a) of FIG. 3, the first polarizer PL1 is disposed such that the first polarization axis AX1 thereof is perpendicular to the second direction Y. The second polarizer PL2 is disposed such that the second polarization axis AX2 thereof is parallel to the second direction Y. In an example shown in part (b) of FIG. 3, the second polarizer PL2 is disposed such that the second polarization axis AX2 thereof is perpendicular to the second direction Y. The first polarizer PL1 is disposed such that the first polarization axis AX1 thereof is parallel to the second direction Y.

Furthermore, a protection plate 3 may be disposed on the outer surface side of the second polarizer PL2. The protection plate 3 has, for example, a planar plate shape, and is disposed to be opposed to the second polarizer PL2. The protection plate 3 includes light-shield portions 31. The light-shield portions 31 are disposed, respectively, on an outside of the active area ACT, and at a boundary between the transmissive display area A1 and reflective display area A2. The light-shield portion 31 blocks leak light due to a disturbance in alignment state of the liquid crystal at the boundary part between the transmissive display area A1 and reflective display area A2. Thus, degradation in display quality can be avoided.

Incidentally, the protection plate 3 may function as a sensor substrate. For example, the protection plate 3 may include a touch sensor TS, such as a resistance-type touch sensor which detects an electrical touch position, an electrostatic-capacitance-type touch sensor which detects a capacitance change position, or an optical touch sensor which is configured such that optical sensors are formed in a matrix in the display device and detects a light amount change position. Besides, a part of the sensor substrate may be incorporated in the liquid crystal display panel LPN.

FIG. 3 is a plan view which schematically illustrates a structure example of one pixel PX at a time when the transmissive display area A1 of the liquid crystal display panel LPN shown in FIG. 1 is viewed from the counter-substrate side. FIG. 3 is a plan view in an X-Y plane.

The pixel PX illustrated has a rectangular shape having a less length in the first direction X than in second direction Y, as indicated by a broken line. A gate line G1 and a gate line G2 extend in the first direction X. A storage capacitance line C1 is disposed between the gate line G1 and the gate line G2 and extends in the first direction X. A source line S1 and a source line S2 extend in the second direction Y. A transmissive pixel electrode PET is disposed between the neighboring source line S1 and source line S2. In addition, the transmissive pixel electrode PET is disposed between the gate line G1 and gate line G2.

In the example illustrated, in the pixel PX, the gate line G1 is disposed at an upper side end portion, the gate line G2 is disposed at a lower side end portion, the source line S1 is disposed at a left side end portion, and the source line S2 is disposed at a right side end portion. Strictly speaking, the gate line G1 is disposed to extend over a boundary between the pixel PX and a pixel neighboring on the upper side, the gate line G2 is disposed to extend over a boundary between the pixel PX and a pixel neighboring on the lower side, the source line S1 is disposed to extend over a boundary between the pixel PX and a pixel neighboring on the left side, and the source line S2 is disposed to extend over a boundary between the pixel PX and a pixel neighboring on the right side. The storage capacitance line C1 is disposed at a substantially central part of the pixel.

The switching element SW in the illustrated example is electrically connected to the gate line G1 and source line S1. The switching element SW is provided at an intersection between the gate line G1 and source line S1. A drain line of the switching element SW is formed to extend along the source line S1 and storage capacitance line C1, and is electrically connected to the pixel electrode PE via a contact hole CH which is formed at an area overlapping the storage capacitance line C1. The switching element SW is provided in an area overlapping the source line S1 and storage capacitance line C1, and does not substantially protrude from the area overlapping the source line S1 and storage capacitance line C1, thus suppressing a decrease in area of an aperture portion which contributes to display.

The transmissive pixel electrode PET includes a main pixel electrode PA and a contact portion PC which are electrically connected to each other. The main pixel electrode PA is formed in a strip shape, and linearly extends in the second direction Y from the contact portion PC to the vicinity of the upper side end portion of the pixel PX and to the vicinity of the lower side end portion of the pixel PX. The main pixel electrode PA is formed in a strip shape having a substantially uniform width in the first direction X. The contact portion PC is located at an area overlapping the storage capacitance line C1, and is electrically connected to the switching element SW via the contact hole CH. The contact portion PC is formed to have a greater width than the main pixel electrode PA. In the example illustrated, the transmissive pixel electrode PET is formed in a cross shape.

The transmissive pixel electrode PET is disposed at a substantially middle position between the source line S1 and source line S2, that is, at a center of the pixel PX. The distance in the first direction X between the source line S1 and the main pixel electrode PA is substantially equal to the distance in the first direction X between the source line S2 and the main pixel electrode PA.

The common electrode CE includes main common electrodes CA in the transmissive display area A1. The main common electrodes CA extend, in the X-Y plane, linearly in the second direction Y that is substantially parallel to the main pixel electrode PA, on both sides of the main pixel electrode PA. Alternatively, the main common electrodes CA are opposed to the source lines S, and extend substantially in parallel to the main pixel electrode PA. The main common electrode CA is formed in a strip shape having a substantially uniform width in the first direction X.

In the example illustrated, two main common electrodes CA are arranged in parallel along the first direction X, and are disposed at both the left side end portion and the right side end portion of the pixel PX. In the description below, in order to distinguish these main common electrodes CA, the left main common electrode in the Figure is referred to as "CAL", and the right main common electrode in the Figure is referred to as "CAR". The main common electrode CAL is opposed to the source line S1, and the main common electrode CAR is opposed to the source line S2. The main common electrode CAL and the main common electrode CAR are electrically connected to each other within the active area or outside the active area. In the pixel PX, the main common electrode CAL is disposed at the left side end portion, and the main common electrode CAR is disposed at the right side end portion. Strictly speaking, the main common electrode CAL is disposed to extend over a boundary between the pixel PX and a pixel neighboring on the left side, and the main common electrode CAR is disposed to extend over a boundary between the pixel PX and a pixel neighboring on the right side.

Paying attention to the positional relationship between the pixel electrode PE and the main common electrodes CA, the pixel electrode PE and the main common electrodes CA are alternately arranged along the first direction X. The main pixel electrode PA and the main common electrodes CA are disposed substantially in parallel to each other. In this case, in the X-Y plane, each of the main common electrodes CA does not overlap the pixel electrode PE. Specifically, one pixel electrode PE is located between the main common electrode CAL and main common electrode CAR which neighbor each other. In other words, the main common electrode CAL and main common electrode CAR are disposed on both sides of a position immediately above the pixel electrode PE. Alternatively, the pixel electrode PE is disposed between the main common electrode CAL and main common electrode CAR. Thus, the main common electrode CAL, main pixel electrode PA and main common electrode CAR are arranged in the named order along the first direction X. The distance in the first direction X between the pixel electrode PE and common electrode CE is substantially uniform. Specifically, the distance between the main common electrode CAL and the main pixel electrode PA in the first direction X is substantially equal to the distance between the main common electrode CAR and the main pixel electrode PA in the first direction X. In the X-Y plane, an aperture portion, which can pass backlight, is formed between the main pixel electrode PA and the main common electrode CA.

FIG. 4 is a plan view which schematically illustrates a structure example of one pixel PX at a time when the reflective display area A2 of the liquid crystal display panel LPN shown in FIG. 1 is viewed from the counter-substrate side. FIG. 4 is a plan view in the X-Y plane. In the description below, a description of the same structure as in the pixel PX in the above-described transmissive display area A1 is omitted.

Like the transmissive display area A1, the pixel PX illustrated has a rectangular shape having a less length in the first direction X than in second direction Y, as indicated by a broken line. A gate line Gi and a gate line Gi+1 extend in the first direction X. A storage capacitance line Ci is disposed between the gate line Gi and the gate line Gi+1 and extends in the first direction X. A source line S1 and a source line S2 extend in the second direction Y.

The switching element SW in the illustrated example is electrically connected to the gate line Gi and source line S1. The switching element SW is provided at an intersection between the gate line Gi and source line S1. A drain line of the switching element SW is formed to extend along the source line S1 and storage capacitance line Ci, and is electrically connected to the reflective pixel electrode PER via a contact hole CH which is formed at an area overlapping the storage capacitance line Ci.

The reflective pixel electrode PER is an electrode with a planar plate shape, and has a substantially rectangular shape having a less length in the first direction X than in second direction Y. Specifically, the reflective pixel electrode PER extends over substantially the entirety of the pixel PX, and is disposed between the neighboring source line S1 and source line S2 and between the neighboring gate line Gi and gate line Gi+1. In other words, substantially no gap is created between the reflective pixel electrode PER and the source line or between the reflective pixel electrode PER and the gate line. In the example illustrated, end portions along the second direction Y of the reflective pixel electrode PER overlap the source line S1 and source line S2, and end portions along the first direction X of the reflective pixel electrode PER overlap the gate line Gi and gate line Gi+1.

The common electrode CE includes a plate common electrode CB with a planar plate shape in the reflective display area A2. Specifically, the planar plate-shaped common electrode CB is opposed to the reflective pixel electrode PER. In addition, the planar plate-shaped common electrode CB is opposed to the source line S1, source line S2, gate line Gi and gate line Gi+1. To be more specific, the planar plate-shaped common electrode CB is disposed to extend over substantially the entirety of the reflective display area A2, so as to face not only the illustrated reflective pixel electrode PER but also plural reflective pixel electrodes PER.

Figure 5:
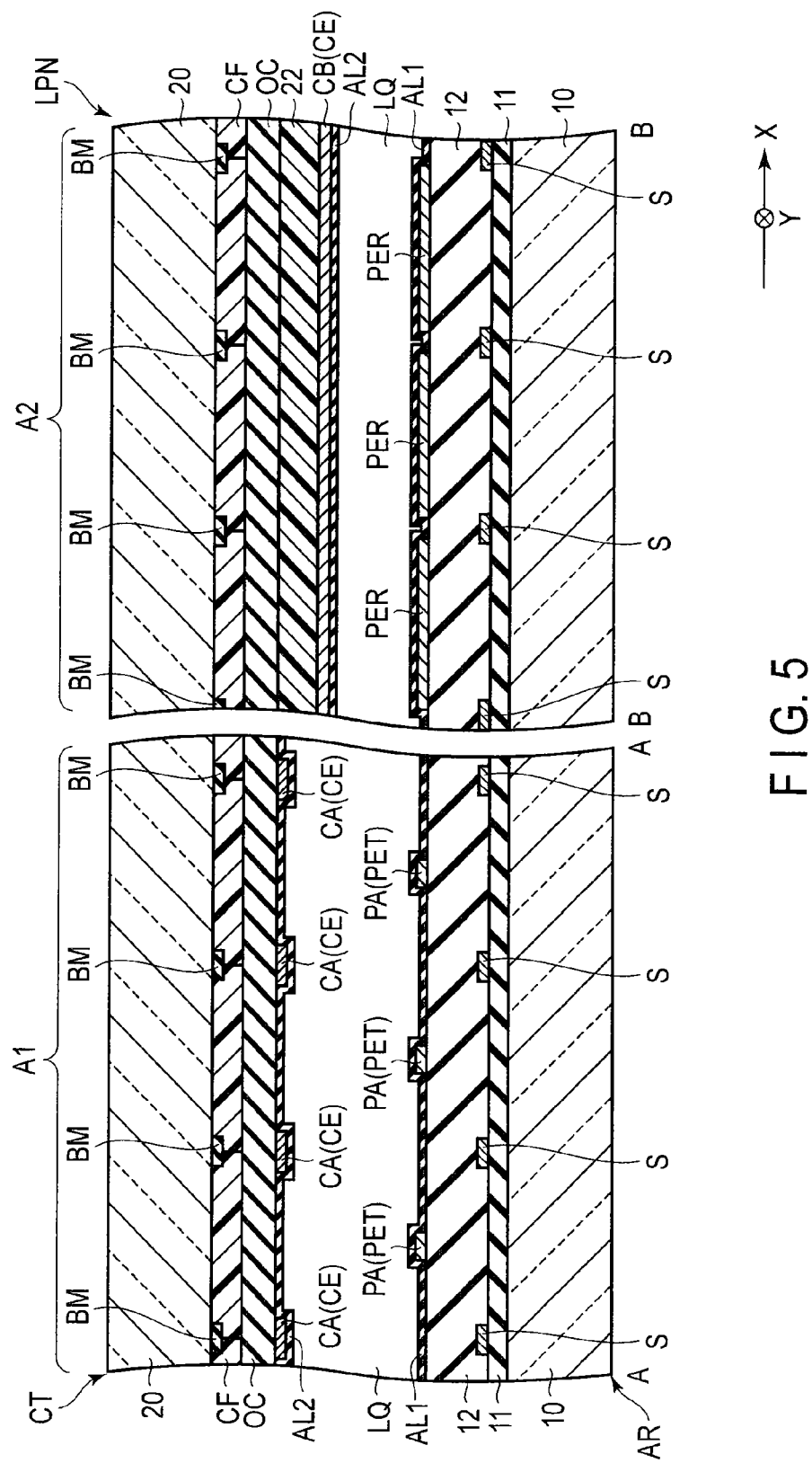
FIG. 5 is a cross-sectional view of a liquid crystal display panel LPN at a time when a transmissive display area A1 is cut along line A-A in FIG. 3, and a cross-sectional view of the liquid crystal display panel LPN at a time when a reflective display area A2 is cut along line B-B in FIG. 4.

FIG. 5 is a cross-sectional view of the liquid crystal display panel LPN at a time when the transmissive display area A1 is cut along line A-A in FIG. 3, and a cross-sectional view of the liquid crystal display panel LPN at a time when the reflective display area A2 is cut along line B-B in FIG. 4.

In the array substrate AR, each source line S is formed on the first interlayer insulation film 11 and is covered with the second interlayer insulation film 12. The transmissive pixel electrode PET and reflective pixel electrode PER are formed on the second interlayer insulation film 12 and are covered with the first alignment film AL1.

In the counter-substrate CT, the black matrix BM is located immediately above the source line S. The main common electrode CA of the common electrode CE is located immediately above the source line S or immediately below the black matrix BM, on the array substrate AR side of the overcoat layer OC. The planar plate-shaped common electrode CB of the common electrode CE is disposed in the entire reflective display area A2, on the array substrate AR side of the projection 22. The planar plate-shaped common electrode CB is opposed to each reflective pixel electrode PER. The main common electrode CA and planar plate-shaped common electrode CB are electrically connected and have the same potential.

Next, the operation of the liquid crystal display panel LPN having the above-described structure is described.

The alignment state of liquid crystal molecules LM at a time when no voltage is applied, that is, in a state (OFF time) in which no electric field is produced between the pixel electrode PE and common electrode CE, is equal between the transmissive display area A1 and the reflective display area A2. For example, when the first alignment treatment direction PD1 is parallel and opposite to the second alignment treatment direction PD2, the liquid crystal molecules LM are homogeneously aligned. When the first alignment treatment direction PD1 is parallel and identical to the second alignment treatment direction PD2, the liquid crystal molecules LM are splay-aligned.

At this time, in the transmissive display area A1, part of light from the backlight 4 passes through the first polarizer PL1, and enters the liquid crystal display panel LPN. The liquid crystal layer LQ imparts no phase difference to the light passing at the OFF time. Thus, the polarization state of the light, which has passed through the liquid crystal display panel LPN, does not change. Accordingly, at the OFF time, the light, which has passed through the liquid crystal display panel LPN, is absorbed by the second polarizer PL2 (black display).

In the reflective display area A2, part of light, which has passed through the protection plate 3, passes through the second polarizer PL2, passes through the retardation plate 25 and liquid crystal display panel LPN, and is then reflected by the reflective pixel electrode PER. The reflected light passes once again through the retardation plate 25 and liquid crystal display panel LPN, and enters the second polarizer PL2. The liquid crystal layer LQ of the reflective display area A2 is configured to impart a phase difference of ¼ wavelength to the light passing at the OFF time. Specifically, linearly polarized light, which has passed through the second polarizer PL2, passes through the retardation plate 25 and liquid crystal layer LQ two times, and is given a phase difference of ½ wavelength. The light with the phase difference becomes linearly polarized light in a direction perpendicular to the polarization direction of the second polarizer PL2, and enters the second polarizer PL2. Thus, the light, which has passed through the retardation plate 25 and liquid crystal layer LQ at the OFF time, is absorbed by the second polarizer PL2 (black display).

On the other hand, in a state in which a voltage is applied to the liquid crystal layer LQ, that is, in a state (ON time) in which a potential difference (or an electric field) is produced between the pixel electrode PE and the common electrode CE, a lateral electric field (or an oblique electric field), which is substantially parallel to the substrates, is produced between the transmissive pixel electrode PET and the common electrode CE in the transmissive display area A1. Thus, the liquid crystal molecules LM of the transmissive display area A1 are aligned in a direction different from the direction in the initial alignment state. Part of light, which has entered the liquid crystal display panel LPN from the backlight 4, passes through the first polarizer PL1, and enters the liquid crystal display panel LPN. The polarization state of the light, which has entered the liquid crystal display panel LPN, varies depending on the alignment state of the liquid crystal molecules LM. At this ON time, at least part of the light emerging from the liquid crystal layer LQ passes through the second polarizer PL2 (white display).

In the reflective display area A2, a vertical electric field along a normal direction of the substrates is produced between the reflective pixel electrode PER and the common electrode CE. Thus, the liquid crystal molecules LM of the reflective display area A2 are aligned in the normal direction of the substrates. Part of light, which has passed through the protection plate 3, passes through the second polarizer PL2, passes through the retardation plate 25 and liquid crystal display panel LPN, and is then reflected by the reflective pixel electrode PER. The reflected light passes once again through the retardation plate 25 and liquid crystal display panel LPN, and enters the second polarizer PL2. The liquid crystal layer LQ is configured to impart no phase difference to the light passing at the ON time. Specifically, linearly polarized light, which has passed through the second polarizer PL2, passes through the retardation plate 25 and liquid crystal layer LQ two times and is given a phase difference of 1 wavelength, and the linearly polarized light, which is parallel to the polarization axis of the second polarizer PL2, enters the second polarizer PL2. Thus, at the ON time, the light, which has passed through the retardation plate 25 and liquid crystal layer LQ, passes through the second polarizer PL2 (white display).

According to the present embodiment, there is no need to dispose a backlight on the back side of the liquid crystal display panel LPN in the reflective display area A2, and a liquid crystal display device with reduced power consumption can be provided.

In the above embodiment, the liquid crystal mode in the transmissive display area A1 may be an IPS mode or an FFS mode. However, in the embodiment, it is possible to simultaneously perform the fabrication step of forming the common electrode CE on the counter-substrate CT in the transmissive display area A1, and the fabrication step of forming the common electrode CE on the counter-substrate CT in the reflective display area A2. Thus, the number of fabrication steps can be made smaller than in the IPS mode or FFS mode. Besides, it is possible to adopt, in the transmissive display area A1, a liquid crystal mode which controls the alignment state of the liquid crystal by making use of a vertical electric field.

In the above-described embodiment, any of liquid crystal modes, which control the alignment state of the liquid crystal by making use of the vertical electric field, can be adopted as the liquid crystal mode in the reflective display mode A2. In the reflective display area A2, it should suffice if the liquid crystal layer LQ is configured such that the phase difference of the passing light at the ON time is zero and the phase difference of the passing light at the OFF time is ¼ wavelength.

In particular, if an electrically controlled birefringence (ECB) mode, which makes use of horizontal alignment (homogeneous alignment) or the like, is used in the reflective display area A2, matching with the liquid crystal mode of the electrode structure in the transmissive display area A1 shown in FIG. 3 can advantageously be obtained.

According to the present embodiment, a high transmittance can be obtained in the inter-electrode gap between the transmissive pixel electrode PET and the common electrode CE in the transmissive display area A1. In addition, a transmittance per pixel can sufficiently be increased by increasing the inter-electrode distance between the main pixel electrode PA and the main common electrode CA. As regards product specifications in which the pixel pitch is different, the peak condition of the transmittance distribution can be used by varying the inter-electrode distance (e.g. by varying the position of disposition of the main common electrode CA in relation to the main pixel electrode PA). Specifically, in the display mode in the transmissive display area A1 of the present embodiment, products with various pixel pitches can be provided by setting the inter-electrode distance, without necessarily requiring fine electrode processing, as regards the product specifications from low-resolution product specifications with a relatively large pixel pitch to high-resolution product specifications with a relatively small pixel pitch. Therefore, requirements for high transmittance and high resolution can easily be realized.

According to the present embodiment, in the transmissive display area A1, the transmittance is sufficiently lowered in the region overlapping the black matrix BM. Thus, even when the colors of the color filters are different between neighboring pixels, the occurrence of color mixture can be suppressed, and the decrease in color reproducibility or the decrease in contrast ratio can be suppressed.

When misalignment occurs between the array substrate AR and the counter-substrate CT, there are cases in which, in the transmissive display area A1, a difference occurs in the distance between the transmissive pixel electrode PET and the common electrodes CE on both sides of the pixel electrode PE. However, since such misalignment commonly occurs in all pixels PX, the electric field distribution does not differ between the pixels PX, and the influence on the display of images is very small.

According to the present embodiment, in the transmissive display area A1, the main common electrodes CA are opposed to the source lines S. In particular, when the main common electrodes CA are disposed immediately above the source lines S, respectively, the aperture portion AP can be increased and the transmittance of the pixel PX can be improved, compared to the case in which the main common electrodes CA are disposed on the transmissive pixel electrode PET side of the source lines S. Furthermore, by disposing the main common electrodes CA immediately above the source lines S, respectively, the inter-electrode distance between the transmissive pixel electrode PET, on one hand, and the main common electrodes CA, on the other hand, can be increased, and a lateral electric field, which is closer to a horizontal lateral electric field, can be produced. Therefore, a wide viewing angle, which is the advantage of an IPS mode, etc. in the conventional structure, can be maintained.

The above-described example is directed to the case where the initial alignment direction of liquid crystal molecules LM is parallel to the second direction Y. However, the initial alignment direction of liquid crystal molecules LM may be an oblique direction D which obliquely crosses the second direction Y, as shown in FIG. 3. An angle θ1 formed between the second direction Y and the initial alignment direction D is greater than 0° and is less than 45°. From the standpoint of alignment control of liquid crystal molecules LM, it is very effective that the angle θ1 is about 5° to 30°, preferably 20° or less. Specifically, it is desirable that the initial alignment direction of liquid crystal molecules LM be substantially parallel to a direction in a range of 0° or more and 20°, relative to the second direction Y.

The above-described example relates to the case in which the liquid crystal layer LQ is composed of a liquid crystal material having a positive (positive-type) dielectric constant anisotropy. Alternatively, the liquid crystal layer LQ may be composed of a liquid crystal material having a negative (negative-type) dielectric constant anisotropy. Although a detailed description is omitted, in the case of the negative-type liquid crystal material, since the positive/negative state of dielectric constant anisotropy is reversed, it is desirable that the above-described formed angle θ1 be in a range of between 45° and 90°, preferably 70° or more.

In the transmissive display area A1 of the embodiment, in the case where the direction, in which the main pixel electrode PA and main common electrode CA linearly extend, is parallel to the alignment treatment direction of the first alignment film and second alignment film, the liquid crystal molecules LM scarcely move from the initial alignment direction even at the ON time, like the OFF time, in the region overlapping the transmissive pixel electrode PET or common electrode CE. Thus, even if the transmissive pixel electrode PET and common electrode CE are formed of a light-transmissive, electrically conductive material such as ITO, little backlight passes through these regions, and these regions hardly contribute to display at the ON time. Accordingly, the transmissive pixel electrode PET and common electrode CE do not necessarily need to be formed of a transparent, electrically conductive material, and may be formed of an opaque, electrically conductive material such as aluminum, silver or copper. Thus, as regards the pixel electrode PE, the transmissive pixel electrode PET may be formed of the same electrically conductive material as the reflective pixel electrode PER, that is, an opaque, electrically conductive material. In the case of the structure in which both the transmissive pixel electrode PET and reflective pixel electrode PER are formed on the second interlayer insulation film 12 and are covered with the first alignment film AL1, the transmissive pixel electrode PET and reflective pixel electrode PER can be formed in the same fabrication step by using the same electrically conductive material. Therefore, in the structure of the embodiment, compared to the structure of other liquid crystal modes, the number of fabrication steps can further be reduced.

Next, other embodiments will be described.

Figure 6:
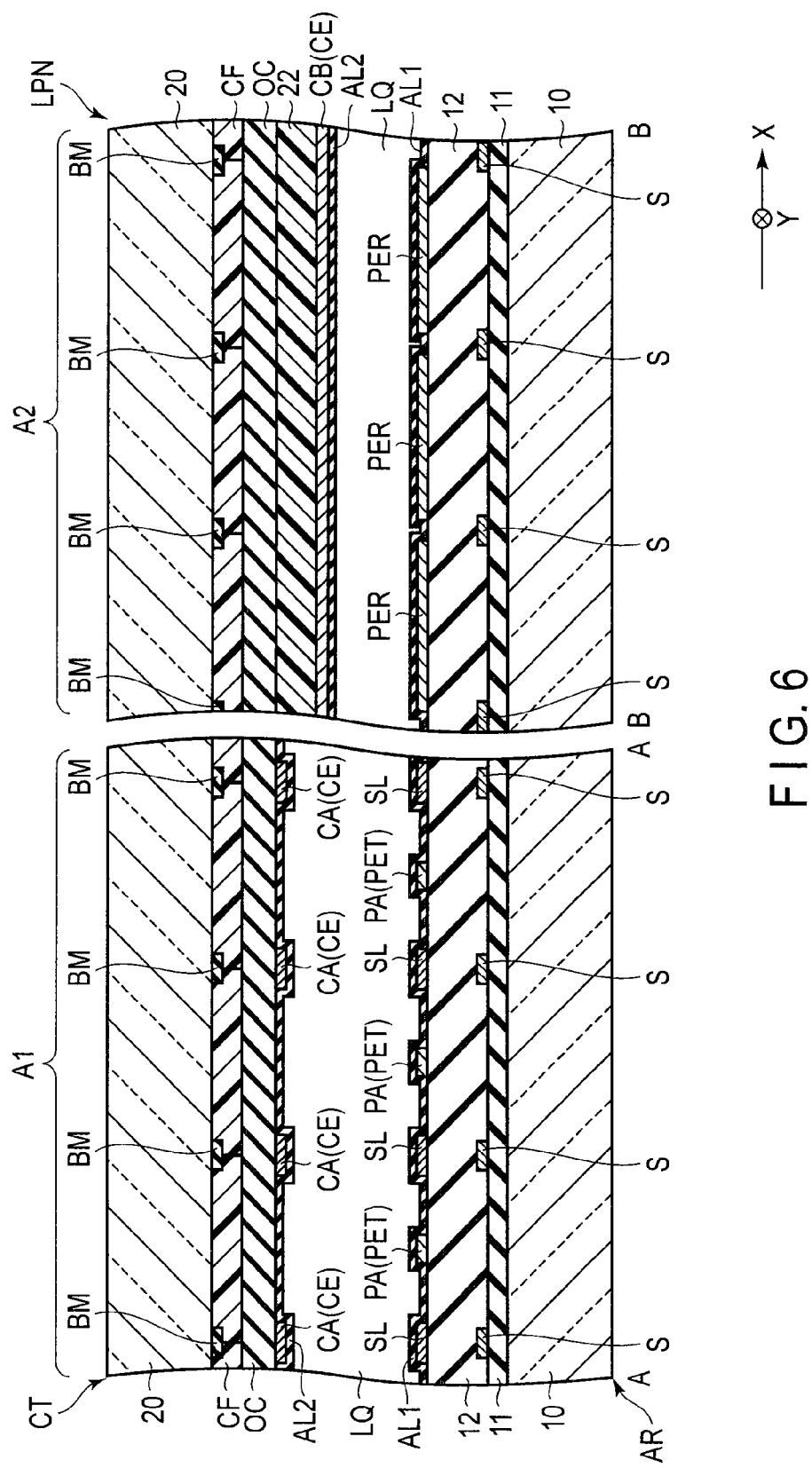
FIG. 6 is another cross-sectional view of the liquid crystal display panel LPN at a time when the transmissive display area A1 is cut along line A-A in FIG. 3, and another cross-sectional view of the liquid crystal display panel LPN at a time when the reflective display area A2 is cut along line B-B in FIG. 4.

FIG. 6 is another cross-sectional view of the liquid crystal display panel LPN at a time when the transmissive display area A1 is cut along line A-A in FIG. 3, and another cross-sectional view of the liquid crystal display panel LPN at a time when the reflective display area A2 is cut along line B-B in FIG. 4.

The example illustrated in FIG. 6 differs from the example illustrated in FIG. 5 in that the array substrate AR includes shield electrodes SL in the transmissive display area A1. The structure of the reflective display area A2 is the same as the structure shown in FIG. 5.

The shield electrodes SL are formed, for example, on the second interlayer insulation film 12. Specifically, the shield electrodes SL, together with the transmissive pixel electrode PET and reflective pixel electrode PER, are covered with the first alignment film AL1. The shield electrodes SL are opposed to the source lines S and are located immediately below the main common electrodes CA. Specifically, the shield electrodes SL extend in parallel to the source lines S and main common electrodes CA. The shield electrodes SL have the same potential as the common electrodes CE. By providing the shield electrodes SL, an undesired electric field from the source lines S can be shielded, and degradation in display quality can further be suppressed. In addition, the shield electrodes SL can be formed of the same material in the same fabrication step as the transmissive pixel electrodes PET, etc.

Incidentally, the array substrate AR may include, in the transmissive display area A1, shield electrodes which are opposed to the gate lines G. By providing such shield electrodes, an undesired electric field from the gate lines G can be shielded, and degradation in display quality can further be suppressed.

Figure 7:
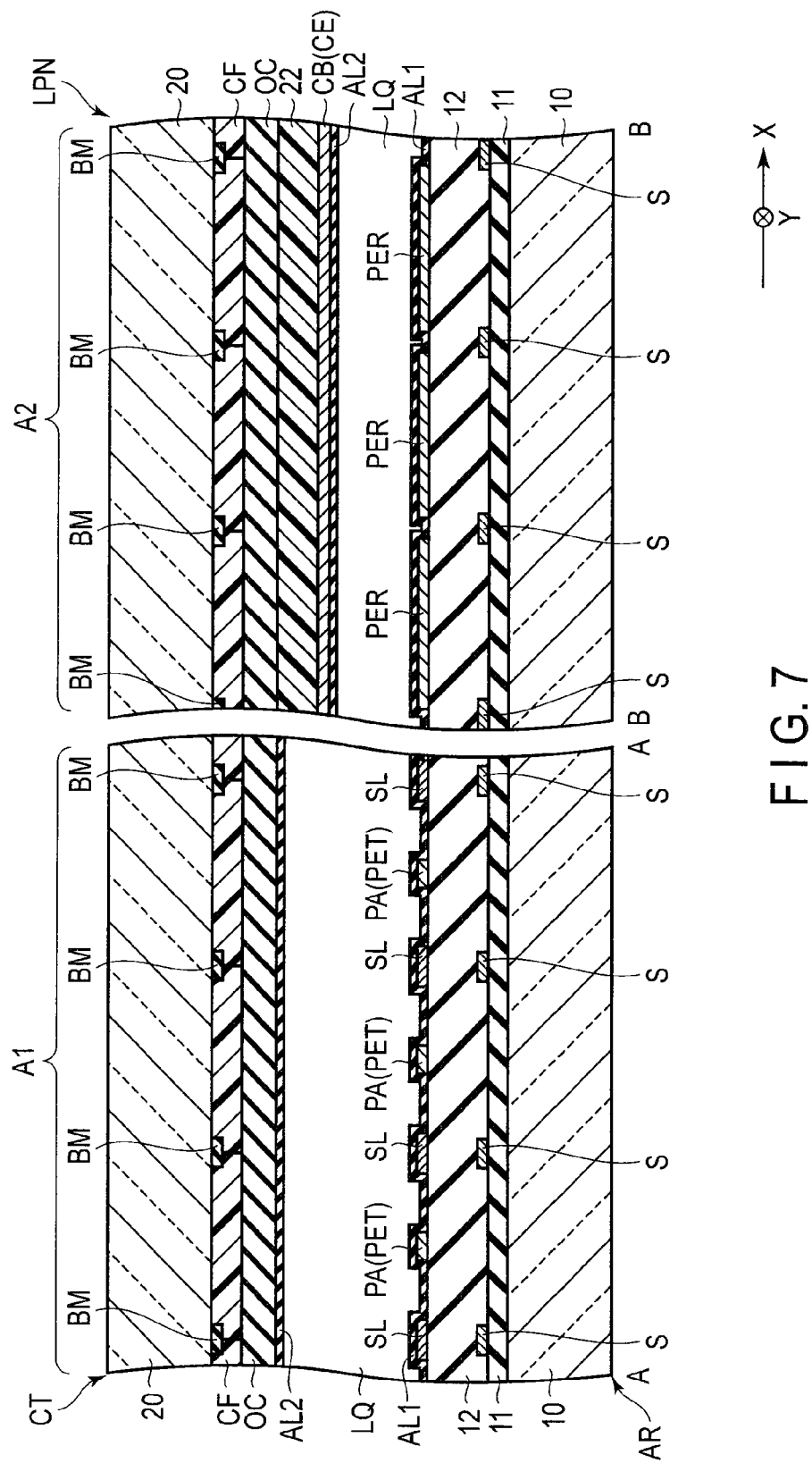
FIG. 7 is another cross-sectional view of the liquid crystal display panel LPN at a time when the transmissive display area A1 is cut along line A-A in FIG. 3, and another cross-sectional view of the liquid crystal display panel LPN at a time when the reflective display area A2 is cut along line B-B in FIG. 4.

FIG. 7 is another cross-sectional view of the liquid crystal display panel LPN at a time when the transmissive display area A1 is cut along line A-A in FIG. 3, and another cross-sectional view of the liquid crystal display panel LPN at a time when the reflective display area A2 is cut along line B-B in FIG. 4.

The example illustrated in FIG. 7 differs from the example illustrated in FIG. 6 in that the counter-substrate CT does not include the main common electrodes in the transmissive display area A1. The structure of the reflective display area A2 is the same as the structure shown in FIG. 5.

In the transmissive display area A1 of the counter-substrate CT, that surface of the overcoat layer OC, which is located on the array substrate AR side, is entirely covered with the second alignment film AL2. In this example, at the ON time, a vertical electric field, which controls the alignment of liquid crystal molecules LM, is formed between the reflective pixel electrodes PER and common electrode CE in the reflective display area A2, as described above, while a lateral electric field, which controls the alignment of liquid crystal molecules LM, is formed between the transmissive pixel electrodes PET and shield electrodes in the transmissive display area A1. In this example, like the above-described embodiment, the alignment state of liquid crystal molecules LM is controlled in the transmissive display area A1, and the same advantageous effects as described above can be obtained.

As has been described above, according to the present embodiment, a liquid crystal display device, which reduces power consumption, can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device comprising:
   a first substrate including a transmissive pixel electrode which is disposed in a transmissive display area and includes a main pixel electrode with a strip shape extending in a second direction, a reflective pixel electrode with a planar plate shape which is disposed in a reflective display area, and a shield electrode which is disposed in the transmissive display area;
   a second substrate including a common electrode which includes a plate electrode with a planar plate shape opposed to the reflective pixel electrode, the common electrode having the same potential as the shield electrode;
   a liquid crystal layer including liquid crystal molecules held between the first substrate and the second substrate, the liquid crystal layer being configured to have a less thickness in the reflective display area than in the transmissive display area, to impart a phase difference of ¼ wavelength to light passing at an OFF time in the reflective display area, and to impart no phase difference to light passing at an ON time in the reflective display area;
   a first polarizer disposed on an outside of the first substrate and having a first polarization axis;
   a second polarizer disposed on an outside of the second substrate and having a second polarization axis which is perpendicular to the first polarization axis; and
   a retardation plate disposed between the second polarizer and the second substrate in the reflective display area, and configured to impart a phase difference of ½ wavelength.

2. The liquid crystal display device of claim 1, wherein the common electrode further includes main common electrodes extending in the second direction on both sides of the main pixel electrode.

3. The liquid crystal display device of claim 2, wherein the first substrate includes a first alignment film covering the transmissive pixel electrode, the reflective pixel electrode and the shield electrode,
   the second substrate includes a second alignment film covering the common electrode, and
   a first alignment treatment direction of the first alignment film and a second alignment treatment direction of the second alignment film are parallel and opposite to each other.

4. The liquid crystal display device of claim 3, wherein the first alignment treatment direction is parallel to the second direction.

5. The liquid crystal display device of claim 4, wherein the liquid crystal molecules are homogeneously aligned in a state in which no electric field is produced between the transmissive pixel electrode and the reflective pixel electrode, on one hand, and the common electrode, on the other hand.

6. The liquid crystal display device of claim 1, further comprising a protection plate disposed to be opposed to the second polarizer,
   wherein the protection plate includes light-shield portions which are disposed, respectively, on an outside of the transmissive display area and the reflective display area, and at a boundary between the transmissive display area and the reflective display area.

7. The liquid crystal display device of claim 6, wherein the protection plate includes a touch sensor.

8. The liquid crystal display device of claim 1, wherein the transmissive pixel electrode and the reflective pixel electrode are formed of the same electrically conductive material.

9. The liquid crystal display device of claim 8, wherein the electrically conductive material is opaque.

10. A liquid crystal display device comprising:
    a first substrate including a transmissive pixel electrode disposed in a transmissive display area, and a reflective pixel electrode disposed in a reflective display area;
    a second substrate including a common electrode which is formed to extend over the transmissive display area and the reflective display area;
    a liquid crystal layer including liquid crystal molecules held between the first substrate and the second substrate, the liquid crystal layer being configured to have a less thickness in the reflective display area than in the transmissive display area, to impart a phase difference of ¼ wavelength to light passing at an OFF time in the reflective display area, and to impart no phase difference to light passing at an ON time in the reflective display area;
    a first polarizer disposed on an outside of the first substrate and having a first polarization axis;
    a second polarizer disposed on an outside of the second substrate and having a second polarization axis which is perpendicular to the first polarization axis; and
    a retardation plate disposed between the second polarizer and the second substrate in the reflective display area, and configured to impart a phase difference of ½ wavelength.

11. The liquid crystal display device of claim 10, wherein the transmissive pixel electrode includes a main pixel electrode with a strip shape extending in a second direction, and
    the common electrode includes main common electrodes extending in the second direction on both sides of the main pixel electrode.

12. The liquid crystal display device of claim 10, wherein the reflective pixel electrode is formed in a planar plate shape, and
    the common electrode includes a plate electrode with a planar plate shape opposed to the reflective pixel electrode.

13. The liquid crystal display device of claim 10, wherein the transmissive pixel electrode includes a main pixel electrode with a strip shape extending in a second direction, and the first substrate further includes shield electrodes which are disposed on both sides of the transmissive pixel electrode.

14. The liquid crystal display device of claim 10, wherein the first substrate includes a first alignment film covering the transmissive pixel electrode and the reflective pixel electrode,
   the second substrate includes a second alignment film covering the common electrode, and
   a first alignment treatment direction of the first alignment film and a second alignment treatment direction of the second alignment film are parallel and opposite to each other.

15. The liquid crystal display device of claim 14, wherein the first alignment treatment direction is parallel to the second direction.

16. The liquid crystal display device of claim 15, wherein the liquid crystal molecules are homogeneously aligned in a state in which no electric field is produced between the transmissive pixel electrode and the reflective pixel electrode, on one hand, and the common electrode, on the other hand.

17. The liquid crystal display device of claim 10, further comprising a protection plate disposed to be opposed to the second polarizer,
   wherein the protection plate includes light-shield portions which are disposed, respectively, on an outside of the transmissive display area and the reflective display area, and at a boundary between the transmissive display area and the reflective display area.

18. The liquid crystal display device of claim 17, wherein the protection plate includes a touch sensor.

19. The liquid crystal display device of claim 10, wherein the transmissive pixel electrode and the reflective pixel electrode are formed of the same electrically conductive material.

20. The liquid crystal display device of claim 19, wherein the electrically conductive material is opaque.

* * * * *